United States Patent [19]

Takatsuki

[11] Patent Number: 4,743,157
[45] Date of Patent: May 10, 1988

[54] VEHICLE WITH GOODS LOADING/UNLOADING APPARATUS

[75] Inventor: Yoshiaki Takatsuki, Kurobe, Japan
[73] Assignee: Yoshida Kogyo K. K., Tokyo, Japan
[21] Appl. No.: 940,958
[22] Filed: Dec. 12, 1986

[30] Foreign Application Priority Data

Dec. 13, 1985 [JP] Japan .......................... 60-190969[U]

[51] Int. Cl.$^4$ .............................................. B60P 3/00
[52] U.S. Cl. .................................. 414/498; 414/429; 414/911; 414/426
[58] Field of Search ............... 414/498, 426, 429, 430, 414/911, 492, 458, 280, 908, 546, 547, 749, 537, 538; 242/35.5 A, 58.6, 79

[56] References Cited

U.S. PATENT DOCUMENTS

| | | | |
|---|---|---|---|
| 2,613,827 | 10/1952 | Van Doorne | 414/537 X |
| 3,892,324 | 7/1975 | Faletti, Jr. | 414/749 |
| 4,575,303 | 3/1986 | Lindell | 414/430 |
| 4,655,670 | 4/1987 | Hogberg et al. | 414/911 X |

Primary Examiner—Robert J. Spar
Assistant Examiner—Vien Nguyen
Attorney, Agent, or Firm—Hill, Van Santen, Steadman & Simpson

[57] ABSTRACT

A vehicle comprised of a chassis frame provided with a plurality of wheels and of a goods loading/unloading apparatus fixedly mounted on the chassis frame. The goods loading/unloading apparatus has a U-shaped body which consists of a flat, rectangular bottom surface portion serving as a bed, and a pair of upstanding wall members formed integrally and extending upwardly from the forward and rearward ends of the bottom surface portion in respect of the vehicle running direction in parallel and opposed relationship with each other; a pair of arm members extending horizontally along the wall members at opposite upper positions on the inner surfaces of both the upstanding wall members, respectively, the arm members being supported at positions by both the upstanding wall members so as to be slidably moved therealong in the horizontal direction; goods supporting units each mounted on each longitudinal end of each of the pair of arm members and having a goods support member which is engageable with the goods and disengageable therefrom; and arm actuators adapted to slidably move both the arm members.

3 Claims, 4 Drawing Sheets

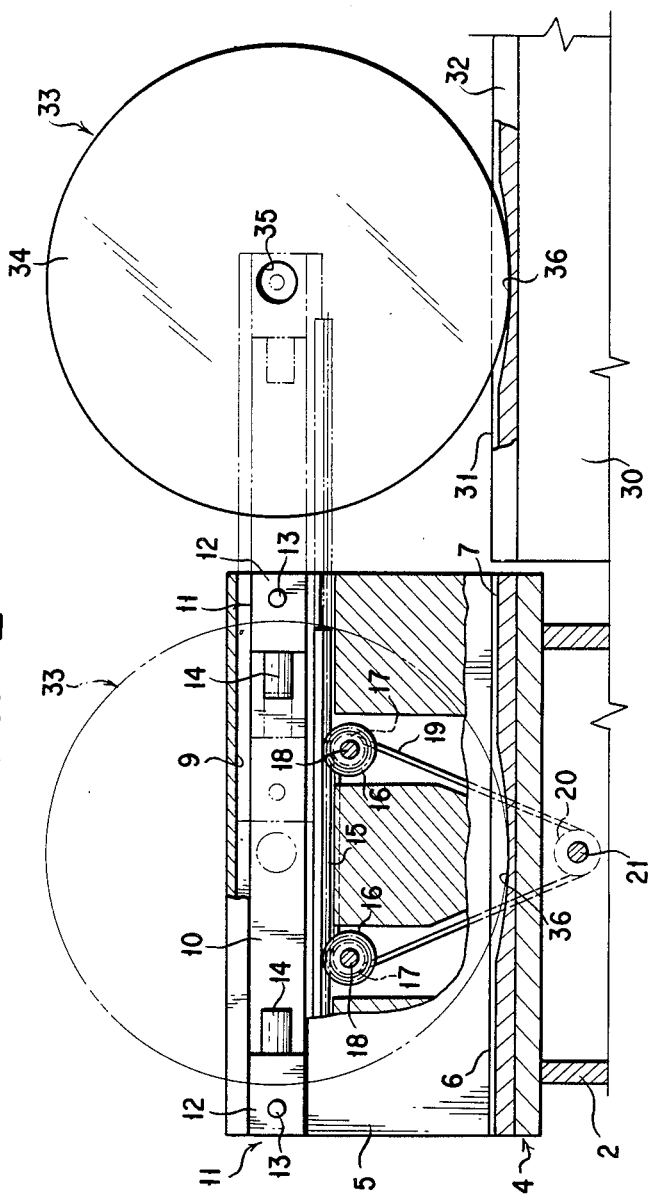

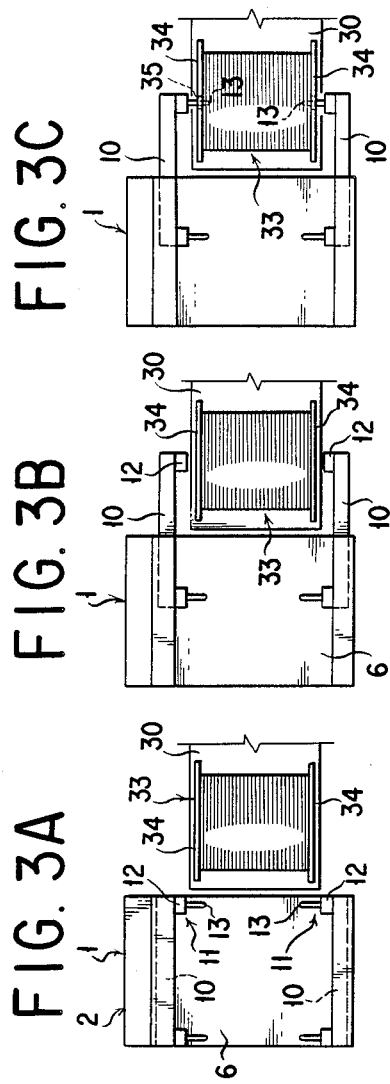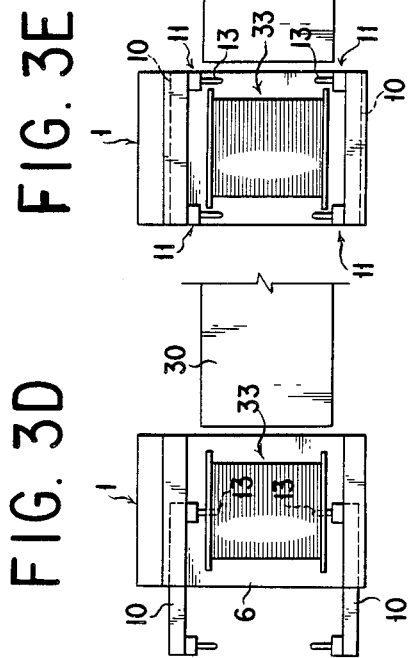

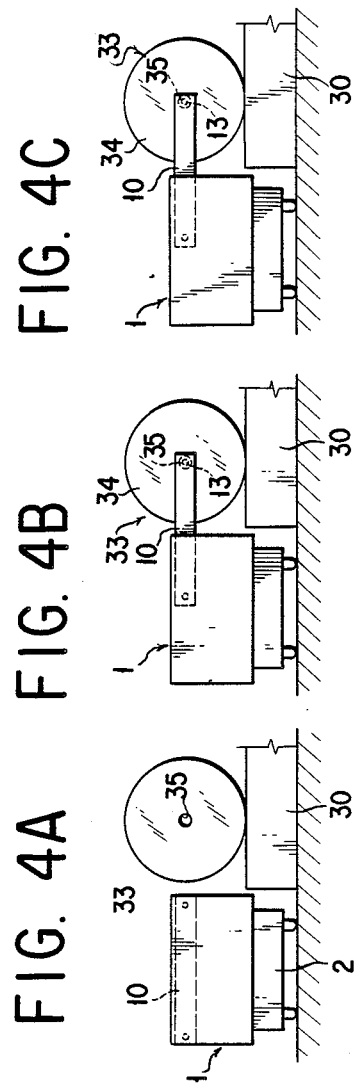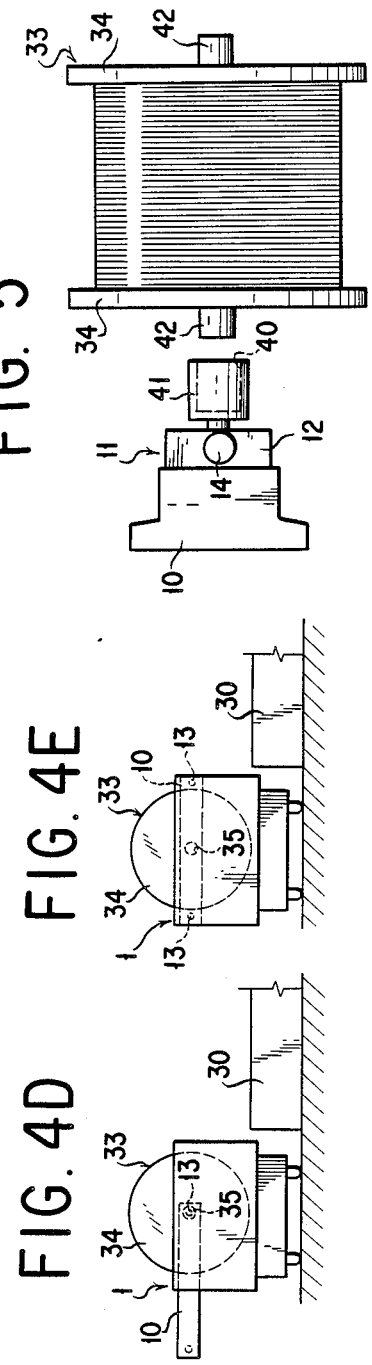

VEHICLE WITH GOODS LOADING/UNLOADING APPARATUS

BACKGROUND OF THE INVENTION

1. Field of the Invention

This invention relates to a vehicle for transporting goods, for example, materials to be processed and finished products etc. in the compound of factories and warehouses, such as, for example, a platform car, a wagon, a bogie, a cart or the like, and more particularly, to a goods loading/unloading apparatus for loading a goods on a bed of the vehicle and unloading it therefrom.

2. Description of the Prior Art

There has heretofore been used a goods loading/unloading apparatus of the kind specified having a goods supporting arm mounted vertically swingably on the coachwork of a vehicle. This conventional goods loading/unloading apparatus is arranged to support goods by means of its arms, and then place the goods on the vehicle body or unload it therefrom by moving the arms up and down. Since the arms are moved up and down while they are supporting the goods, not only the arms and their portions to be mounted on the vehicle body need to be formed of a robust construction, but also a strong force is required to move the arms, which results in increase in energy consumption by a prime mover for driving the arm such as a motor etc. Further, upon placing goods onto the vehicle, the goods is supported on the vehicle with the arms held at their upper positions. Therefore, the goods is placed at a compartively high position relative to the vehicle body, so that the vehicle becomes top-heavy or unstable in running condition. Further, since the goods tends to oscillate vertically, when the vehicle is running, there is always a risk involved for its operator.

SUMMARY OF THE INVENTION

The present invention has been contemplated and devised in view of the above-mentioned circumstances in the conventional vehicles, and has for its object to provide a goods loading/unloading apparatus for a vehicle of the kind specified having a comparatively simple goods supporting units arranged so as not to be subjected to a high loading, and which requires less energy consumption for movements of the goods.

Another object of the present invention is to provide a goods loading/unloading apparatus by means of which goods can be loaded on the vehicle and unloaded therefrom safely and readily.

A further object of the present invention is to provide a vehicle capable of effecting loading and unloading of a goods under a safe and stable condition, and which can be driven safely even under a goods laden condition.

To achieve the above-mentioned objects, according to the present invention, there is provided a goods loading/unloading apparatus, comprising a U-shaped body which consists of a flat, rectangular bottom surface portion serving as a bed, and a pair of upstanding wall members formed integrally and extending upwardly from the two longitudinal ends of the bottom surface portion in parallel and opposed relationship with each other; a pair of arm members extending horizontally at opposite upper positions on the inner surfaces of both the upstanding wall members, respectively, said arm members being supported at these positions by both the upstanding wall members, respectively, so as to be slidably moved therealong in the horizontal direction; goods supporting units mounted on the two longitudinal ends of the pair of arm members, each of the goods supporting units having a goods support member which is engageable with the goods and disengageable therefrom; and arm actuator means adapted to slidably move both the arm members.

To achieve the aforementioned objects, according to the present invention, there is further provided a vehicle comprised of a chassis frame provided with a plurality of wheels and a goods loading/unloading apparatus fixedly mounted on the chassis frame, characterized in that the goods loading/unloading apparatus comprises a U-shaped body which consists of a flat, rectangular bottom surface portion serving as a bed, and a pair of upstanding wall members formed integrally and extending upwardly from the two forward and rearward ends of the bottom surface portion in respect of the vehicle running direction in parallel and opposed relationship with each other; a pair of arm members extending horizontally at opposite upper positions on the inner surfaces of both the upstanding wall members, respectively, said arm members being supported at these positions by both the upstanding wall members, respectively, so as to be slidably moved therealong in the horizontal direction; goods supporting units mounted on the two longitudinal ends of each of the pair of arm members, each of the goods supporting units having a goods support member which is engageable with the goods and disengageable therefrom; and arm actuator means adapted to slidably move both the arm members.

According to the present invention, the body of the goods loading/unloading apparatus has a pair of goods guide members fixedly secured to the bottom surface portion thereof and extending adjacent to and in parallel relationship with both the upstanding wall members.

According to another aspect of the present invention each of the goods supporting units has a housing fixedly secured to each of the arm members so as to accommodate the goods support member, and each of the housings is provided with an actuator means or unit adapted to actuate the goods support member, the arrangement being made such that pairs of opposed goods support members are moved towards or away from each other by means of their respective actuator means in the direction at right angles to the direction of sliding of the arm members.

According to a further aspect of the present invention, the arm actuator means comprises a rack fixedly secured to the lower part of each of the arm members so as to extend longitudinally of the latter; a pair of pinions fixedly mounted on a pair of support shafts journalled at a predetermined space interval on each of the upstanding wall members, said pinions being arranged to mesh with their respective racks, and rotatable bidirectionally; a pair of pulleys fixedly mounted on their respective pinion support shafts so as to be rotated synchronously with rotation of the pinions; a drive shaft extending under the bottom surface portion of the body of the goods loading/unloading apparatus and between both the upstanding wall members; and a drive pulley fixedly secured to the drive shaft so as to transmit the driving power through a power transmission means to the pair of pulleys.

According to a further aspect of the present invention, each of the pair of goods guide members has a longitudinally extending slot formed therein along the whole length thereof so as to open upwardly.

According to a still further aspect of the present invention, each of the goods guide slots is formed to enlarge or flare outwardly at its both ends, and has a circular-arc shaped recess formed in the substantially longitudinal, central part thereof, the circular-arc shaped recess being formed so as to become progressively lower in height towards its lowermost point.

According to another aspect of the present invention, each of the goods support members is a finger adapted to be engaged with each one of the recesses formed on both sides of the goods.

According to a further aspect of the present invention, each of the goods support members is a coupling having a recess adapted to be engaged with each of projections formed on both sides of the goods.

According to a further aspect of the present invention, the power transmission means for transmitting the driving power from the drive pulley to the pulleys of the pair of pinions is at least one piece of belt wound round the three pulleys.

According to a still further aspect of the present invention, all the drive pulley and the respective pulleys of the pair of pinions are gears, and the power transmission means for the three gears is at least one piece of chain wound round them.

The above and many other advantages, features and additional objects of the present invention will become apparent to those versed in the art upon making reference to the following detailed description and accompanying drawings in which structural embodiments incorporating the principles of the present invention are shown by way of illustrating example.

BRIEF DESCRIPTION OF THE DRAWINGS

FIG. 2 is a partially broken-away schematic front view of the vehicle and the stationary bed shown in FIG. 1;

FIGS. 3A to 3E are plan views, respectively, showing goods loading and unloading operations to be carried out by the goods loading/unloading apparatus according to the present invention;

FIGS. 4A to 4E are front views corresponding with FIGS. 3A to 3E, respectively; and FIG. 5 is a schematic from view showing another embodiment of the goods supporting arrangement for use in the goods loading/unloading apparatus according to the present invention.

DETAILED DESCRIPTION OF THE PREFERRED EMBODIMENTS

Figure 1:
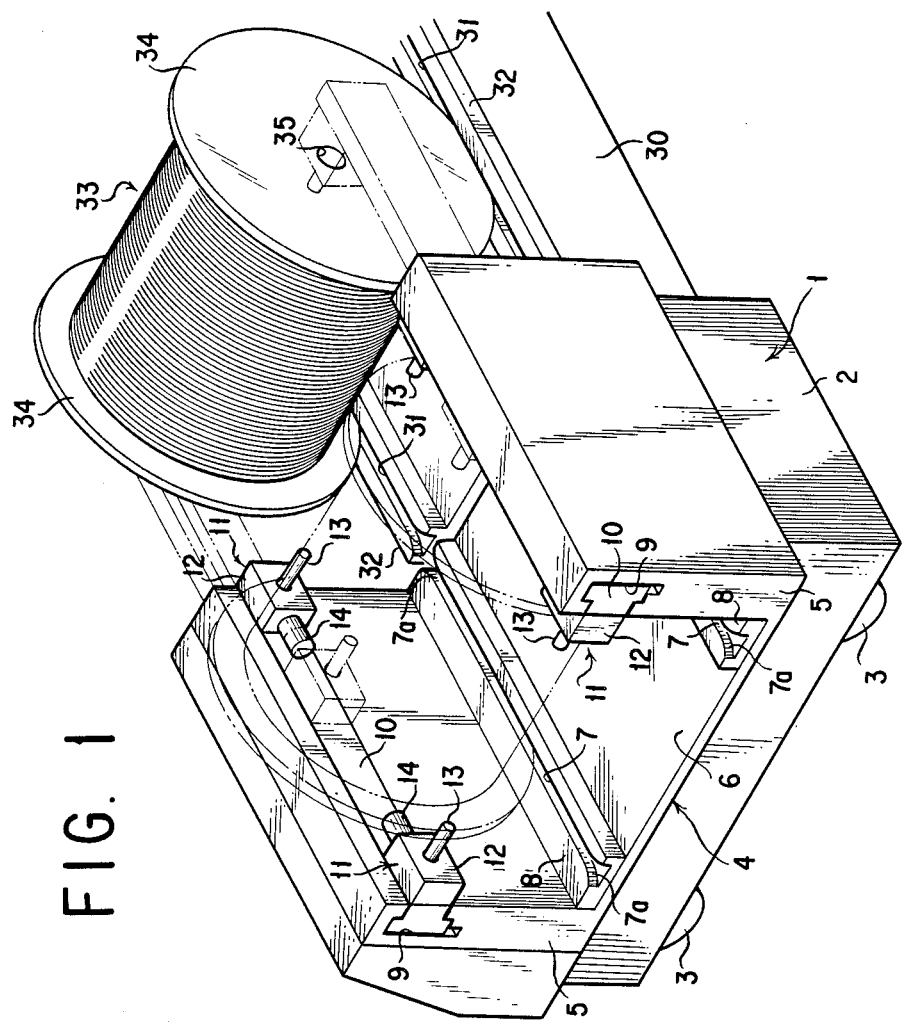
FIG. 1 is an overall perspective view of a vehicle provided with a goods loading/unloading apparatus according to the present invention, and a platform or a stationary bed loaded with a goods.

One embodiment of the vehicle provided with the goods loading/unloading apparatus according to the present invention will now be described in detail below with reference to FIGS. 1 and 2.

As shown in the drawings, in this embodiment, the vehicle for transporting a bobbin shaped goods formed with flanges at both end thereof, loading and unloading it will be described. However, it is to be understood that the goods to be handled by the vehicle is not limited to such a configuration, and instead, a cylindrical goods without flanges or a bobbin having a long cloth, tape, paper, rope, wire, sheet metal or the like wound round or alternatively a cylindrical mechanical parts or wheels for use in transport means of a round section can be loaded, unloaded and transported suitably.

In FIGS. 1 and 2, reference numeral 1 denotes a vehicle having a chassis frame 2 fitted with a plurality of wheels 3 and a bed 4 which is lower in height than generally used trucks.

The bed 4 is provided with a goods loading/unloading apparatus which will be described in detail below. This goods loading/unloading apparatus has a body of a U-shaped longitudinal section which consists of a flat horizontal bottom surface portion 6 serving as a bed, and a pair of upstanding wall members 5, 5 formed integrally and extending upwardly from the two forward and rearward ends of the bottom surface portion 6 in respect of the forward and backward running direction of the vehicle 1 in parallel and opposed relationship with each other.

The bottom surface portion 6 has a pair of goods guide members 8, 8 extending adjacent to the upstanding wall members 5, 5 and parallel with the latter and fixedly secured thereto at intervals of a predetermined space with respect to the direction of forward and backward running of the vehicle 1. Each of the goods guide members 8, 8 has an overall length equal to the transverse width of the bottom surface portion 6. Further, each goods guide member 8 has an upwardly open guide slot 7 formed in the central part thereof and extending over the whole length thereof and in parallel with each of the upstanding wall members 5, 5.

Both ends 7a, 7a of this guide slot 7 are enlarged or flared outwardly, when looking from the above, to enable flanges 34 of a bobbin 33, for example, to be introduced smoothly therein when the bobbin 33 is loaded on the vehicle 1. Further, the guide slot 7 has a circular-arc shaped recess 36 formed in the longitudinal central part thereof as shown in FIG. 2 and the height of which becomes lower towards the lowermost point thereof to enable the bobbin 33 to rest stably on the bed 4.

Each of the upstanding wall members 5, 5 has a horizontally extending recess or slot 9 formed in the upper part of each of the opposite inner surfaces thereof and extending across the whole lateral width thereof. An arm member 10 having a length approximately equal to the whole lateral width of each of the wall members 5, 5 is inserted in the recess or slot 9 so as to reciprocate or slidably move freely in the direction at right angles to the direction of forward and backward running of the vehicle 1.

Each of the arm members 10, 10 is provided with goods supporting units 11, 11 at both ends thereof. Each of the goods supporting units 11, 11 has a housing 12 fixedly secured to the arm member 10, and a goods supporting member 13 such as, for example, a finger adapted to be moved forwards and rearwards by means of an actuator unit 14 such as a motor relative to the housing 12 in respect of the direction of forward and backward running of the vehicle 1.

Further, the foregoing description of the goods loading/unloading apparatus is made with reference to one of the pair of opposed upstanding wall members 5, 5. However, the other of the wall members 5, 5 has an identical construction, and therefore description of it is omitted herein to avoid duplication of explanation. The arm members 10, 10 disposed at opposite positions on both the upstanding wall members 5, 5 are arranged to slidably move in the same direction synchronously with each other during goods loading and unloading operations. Whilst, the opposed goods support members 13, 13 mounted, respectively, on the two ends of the arm members 10, 10 are arranged to be moved towards and away from each other synchronously with each other during goods loading and unloading operations.

In the next place, an arm actuator unit for slidably moving the arm members 10, 10 will be described below with reference to FIG. 2.

Each of the arm members 10, 10 has a rack 15 fixedly secured to the lower part thereof along the approximately whole length thereof. At least one pinion 16 in mounted on at least one support shaft 18 (two shafts in the embodiment shown) journalled in the upstanding wall member 5 and is arranged to mesh with the rack 15. The pinion 16 is bidirectionally rotatable. Each of the support shafts 18 has also a pulley 17 mounted thereon and connected to the pinion 16 to rotate the latter synchronously therewith. Whilst, a drive shaft 21 journalled in the chassis frame 2 and connected to a rotational drive power source not shown is mounted under the bed 4. The drive shaft 21 has a drive pulley fixedly mounted thereto.

Thus, rotation of the drive shaft 21 is transmitted to the pinions 16 through a power transmission means such as, for example, at least one belt 19 wound around the pulleys 17 connected to the pinions 16, respectively, and a drive pulley 20 to thereby enable the arm members 10, 10 to be slidably moved.

Further, in the above-mentioned arm actuator unit, a combination of pulleys and a belt is used; however, gears can be used in place of the pulleys, and a chain can be used instead of the belt. A more reliable and safe power transmission can be obtained by using the combination of gears and a chain.

Reference numeral 30 denotes a platform or a stationary bed installed in the premises of factories etc. The stationary bed 30 has, in the upper part thereof, a goods guide member 32 and a guide slot 31 formed opposite to the goods guide member 8 and the guide slot 7 in the goods loading/unloading apparatus of the vehicle 1 at the same space interval and at the same height as the latter.

Further, each of the flanges 34 of the bobbin 33 which is a goods to be handled has a hole 35 formed in the outer central part thereof and adapted to be engaged with a finger 13 which serves as a goods support member.

Next, operation of the goods loading/unloading apparatus constructed as mentioned above will be described below with reference to FIGS. 3A to 3E and FIGS. 4A to 4E.

Further, FIGS. 3A to 3E and FIGS. 4A to 4E are plan views and front views, respectively, which correspond with each other.

As shown in FIGS. 3A and 4A, the vehicle 1 which has a pair of arm members 10, 10 respectively retracted into the upstanding wall members 5, 5 is stopped at a predetermined position opposite and adjacent to the stationary bed 30.

Subsequently, as shown in FIGS. 3B and 4B, the pair of arm members 10 with the fingers 13 of the right hand goods supporting units 11 retracted inside their respective housings 12 are slid towards the bobbin 33 to such a position as the right hand fingers 13 are brought opposite to the holes 35 formed in the outer central parts of the flanges 34 of the bobbin 33. With the arm members 10 located at this position, as shown in FIGS. 3C and 4C, the motors 14 are actuated to allow the right hand fingers 13, 13 to project so as to fit them into the holes 35, 35 of the bobbin 33 to thereby enable the latter to be supported by the pair of arm members 10, 10. At that time, the fingers 13 can be smoothly fitted into the holes 35 even in the case where there is some positional error, since the holes 35 are larger in diameter than the fingers 13. Thereafter, as shown in FIGS. 3D and 4D, the pair of arm members 10 with the bobbin 33 supported thereby are slidably moved to the left while the pair of flanges 34, 34 of the bobbin 33 are rotated or slid along the guide slots 31 and 7 to such a position as the bobbin 33 rests on the bed 6.

Upon completion of resting of the bobbin 33 on the bed 4, as shown in FIGS. 3B and 4E, the right hand projected fingers 13 are retracted into their respective housings 12 to release the bobbin 33 from the fingers 13, and then the pair of arm members 10, 10 are slidably moved to the right so as to be returned to their initial positions. Upon completion of returning of the arm members 10, 10 to their original positions, the right hand fingers 13, 13 are projected again from their housing 12, 12 to thereby prevent the bobbin 33 from dropping from the bed 4 during transportation by the vehicle 1.

Further, when it is desired to unload the bobbin 33 from the chassis frame 2, it is only necessary to carry out an operation reverse to the aforementioned operation.

According to the vehicle provided with the goods loading/unloading apparatus of the present invention constructed and operable as mentioned above, in addition to the above-mentioned operational effect, there is obtained another advantageous feature that since goods supporting units 11 are respectively provided on both left and right sides of the pair of arm members 10, 10, the bobbin 33 can be loaded on the vehicle 1 from the stationary bed 30 on either of left and right sides, and unloading from the vehicle 1 onto the bed 30 without having to change the direction of the chassis frame 2. Stating more specifically, for example, under the condition that the bobbin 33 rests on the bed 6 as shown in FIGS. 3E and 4E, the fingers 13 of the left hand goods supporting units 11 are allowed to fit in the holes 35, and then the arm members 10 can be slidably moved to the left so that the bobbin 33 loaded on the bed 6 of the vehicle 1 from the right side may be unloaded from the left side of the vehicle 1 without having to change the direction of the chassis frame 2.

Further, if the fingers 13 of the goods supporting units 11 on both left and right sides of the pair of arm members 10 are projected out under the condition that the bobbin 33 rests on the bed 6, the bobbin 33 is sandwiched in between the left and right hand fingers 13 so that the bobbin 33 may be prevented from dropping from the bed 6 during running of the vehicle.

Furthermore, the goods supporting units 11 may be constructed so as to allow the fingers 13 to project out and retract by means of hydraulic cylinders, or alternatively, motors may be used in combination with racks and pinions to project out and retract the fingers 13. Further, as shown in FIG. 5 each of the goods support members may be constructed in the form of a coupling 41 having a recess 40 formed therein, and a projection 42 may be formed in the outside central part of each flange 34 of the bobbin 33 so that the projections 42 may be fitted in their corresponding couplings 41 thereby supporting the bobbin 33 in position.

Further, the vehicle may be of unmanned, or manned or pushcart type.

Furthermore, by providing rolling means such as rollers in the goods guiding parts, even prismatic goods and those having a rectangular sectional shape can be loaded and unloaded readily by means of the goods loading/unloading apparatus according to the present invention.

It is to be understood that the foregoing description is merely illustrative of preferred embodiments of the present invention, and that the scope of the present invention is not to be limited thereto, but is to be determined by the scope of the appended claims.

What we claim is:

1. A goods loading/unloading apparatus, comprising a U-shaped body consisting of a flat, rectangular bottom surface portion serving as a bed, and a pair of upstanding wall members formed integrally and extending upwardly from the two longitudinal ends of the bottom surface portion in a manner of being in parallel and opposed relationship with each other; a pair of arm members extending horizontally at opposite upper positions on the inner surfaces of both the upstanding wall members, respectively, said arm members being supported at said positions by both the upstanding wall members so as to be slidably moved therealong in the horizontal direction; goods supporting units each mounted on each longitudinal end of each of the pair of arm members and having a goods support member which is engageable with the goods and disengageable therefrom; arm actuator means adapted to slidably move both the arm members; wherein said arm actuator means comprises a rack fixedly secured to the lower part of each of the arm members so as to extend longitudinally of the latter; a pair of pinions fixedly mounted on a pair of support shafts journalled at a predetermined space interval on each of said upstanding wall members, said pinions being arranged to mesh with their respective racks, and rotatable bidirectionally; a pair of pulleys fixedly mounted on their respective pinion support shafts so as to be rotated in synchronism with the rotation of the pinion; a drive shaft extending under the bottom surface portion of said body of the goods loading/unloading apparatus and between both said upstanding wall members; and a drive pulley fixedly secured to said drive shaft so as to transmit the driving power through a power transmission means to said pair of pulleys.

2. The goods loading/unloading apparatus as claimed in claim 1, characterized in that said power transmission means is at least one piece of belt wound round said three pulleys.

3. The goods loading/unloading apparatus as claimed in claim 1, characterized in that all said three pulleys are gears, and said power transmission means is at least one piece of chain wound round the three gears.

* * * * *